United States Patent Office 3,415,933
Patented Dec. 10, 1968

3,415,933
INSECTICIDAL METHOD AND COMPOSITIONS COMPRISING HETEROCYCLIC CARBAMIC ACID ESTERS
Kurt Gubler, Riehen, Switzerland, assignor, by mesne assignments, to H. A. Whitten & Co., New York, N.Y., a partnership
No Drawing. Original application Mar. 19, 1964, Ser. No. 353,268, now Patent No. 3,342,832, dated Sept. 9, 1967. Divided and this application Jan. 31, 1967, Ser. No. 627,580
Claims priority, application Switzerland, Mar. 22, 1963, 3,664/63
8 Claims. (Cl. 424—273)

ABSTRACT OF THE DISCLOSURE

Insecticidal compositions which comprise as active agents a compound of the formula

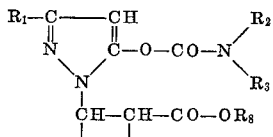

or a compound of the formula

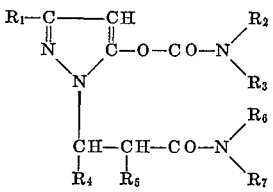

wherein $R_1$ is H or lower alkyl,
$R_2$ and $R_3$ each is lower alkyl or alkenyl,
$R_4$ and $R_5$ each is H, lower alkyl, Cl, Br or F,
$R_6$ is H, lower alkyl, substituted lower alkyl, cyclohexyl, subst. cyclohexyl, phenyl, or subst. phenyl,
$R_7$ is H, lower alkyl, or subst. lower akyl,
$R_6$ and $R_7$ can be piperidino, morpholino, lower alkyl-piperidino or lower alkyl-morpholino,
$R_8$ is lower alkyl, lower alkenyl, phenyl, substituted phenyl, phenyl-lower alkyl, etc., are suitable for combatting various insects and their larvae, especially *Planococcus citri* and larvae of *Lucilia cuprina*, which are resistant to known pyrazolyl-carbamates.

---

This application is a division of Ser. No. 353,268, filed Mar. 19, 1964, now U.S. Patent No. 3,342,832, issued Sept. 9, 1967.

The present invention concerns the use of certain heterocyclic carbamic acid esters and their salts as active ingredients for combatting pests, as well as processes for combatting pests using the said compounds and/or their salts or using agents which contain these substances as active ingredients.

It has been found that heterocyclic carbamic acid esters of the formula

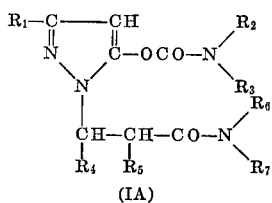

(IA)

and

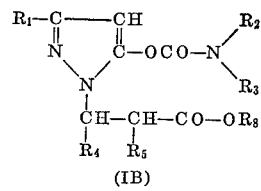

(IB)

wherein $R_1$ represents hydrogen or lower alkyl; lower in connection with an aliphatic radical meaning, in this specification and the appended claims, a radical of from 1 to 4 carbon atoms,
$R_2$ represents hydrogen or a lower aliphatic hydrocarbon radical, in particular lower alkyl or alkenyl of from 3 to 4 carbon atoms,
$R_3$ represents a lower aliphatic hydrocarbon radical, in particular lower alkyl or alkenyl of from 3 to 5 carbon atoms,
each of $R_4$ and $R_5$ represents hydrogen, lower alkyl, chlorine, bromine or fluorine,
$R_6$ represents hydrogen, lower alkyl, cyclohexyl, lower alkyl-cyclohexylphenyl, lower alkyl-phenyl, chlorophenyl, bromophenyl, hydroxy-lower alkyl, lower alkoxy-lower alkyl, chloro-lower alkyl, bromo-lower alkyl and cyano-lower alkyl, lower alkyl in the last five members having preferably from 2 to 3 carbon atoms,
$R_7$ represents hydrogen, lower alkyl, hydroxy alkyl, lower alkoxy-lower alkyl, chloro-lower alkyl, bromo-lower alkyl and cyano-lower alkyl, lower alkyl in the last five members having preferably from 2 to 3 carbon atoms,
$R_6$ and $R_7$ taken together with the nitrogen atom to which they are linked represent piperidino, morpholino, lower alkyl-piperidino or lower alkyl-morpholino, and
$R_8$ represents alkyl of from 1 to 6 carbon atoms, alkenyl of from 2 to 6 carbon atoms, propargyl methyl-propargyl, cyclopentyl, lower alkyl-cyclopentyl, cyclohexyl, lower alkyl-cyclohexyl, cyclopentenyl, cyclohexenyl, lower alkyl-cyclopentenyl, lower alkyl-cyclohexenyl, phenyl, lower alkylphenyl, chlorophenyl, bromophenyl, lower alkoxyphenyl, nitrophenyl, cinnamyl, chloro-alkyl, bromo-alkyl, hydroxy-alkyl, lower alkoxy-alkyl and lower alkylthio-alkyl, alkyl in the last five members being from 2 to 4 carbon atoms, phenyl-alkyl, chloro-phenylalkyl, bromophenyl-alkyl and lower alkyl-phenyl-alkyl, alkyl in the last four members having from 1 to 2 carbon atoms, are particularly suitable for combatting certain insects or their larvae against which known pyrazolylcarbamates fail to show significant effects. Such insects are, particularly, mealy bugs (*Planococcus citri*) and the larvae of the blow fly (*Lucilia cuprina*), while possessing slight toxicity to warm blooded animals. Moreover, they can be used as contact or systemic insecticides and are of great importance in hygiene, veterinary medicine as well as in plant protection. In addition, these compounds and their salts have a good action against fungi and bacteria.

The toxicity of the compounds of Formula IA to warm-blooded animals is only of the same order as that of known 1-phenyl-1-alkyl- or 1-alkoxy-alkyl-1-N,N-dimethyl-carbamyloxypyrazoles while that of the compounds of Formula IB is even much less.

Known 1-cyano-ethyl-5-N,N-dimethyl-carbamyl-oxy-pyrazoles have a very narrow insecticidal spectrum being active in the first line against houseflies and aphids, while failing, for instance, to act as stomach poisons against such insects normally very susceptible thereto, such as the Colorado beetle; 1 - carboxy-ethyl-5-N,N-dimethyl-carbamyl-oxy-pyrazoles are practically ineffective as commercially useful insecticides.

The compounds of the Formulas IA and IB are stable in water, dissolve well in organic solvents and some of them also in water. In general, they are liquids which can be distilled well; some are crystalline with a low melting point.

The compounds of Formulas IA and IB have been tested for their activity against insects of the following orders or types:

Heteroptera: pyrrhocoridae. Homoptera: pseudococcidae, aphididae, Diptera: culicidae, muscidae. Orthoptera: acrididae, blattidae, Coleoptera: dermestidae, tenebrionidae, chrysomelidae, bruchidae, curculionidae. Lepidoptera: pyralididae, noctuidae. Hymenoptera: formicidae; as well as spiders of the families: Tetranychidae, Argasidae and Ixodidae of the Acarina order.

in concentration of 1 g./sq. meter. The objects having surfaces thus prepared were stored at room temperature (20° C.). 2½ and 60 days, respectively, after the time of applying the active substance: glass bells having a volume of 1 liter were placed with their opening upon the aforesaid surfaces. Each glass bell contained 10 mosquitoes (*Aedes aegypti*) or 10 cockroaches (*Phyllodromia germanica*) respectively. The time is determined within which all 10 insects have adopted dorsal position. These times are given in the second and third columns of Table III for mosquitoes and in the fourth and fifth columns of Table III for cockroaches.

Spotted spider mites (*Tetranychus urticae*) were used to test the acaricidal activity of compounds of the general Formula I. It was found that they had a very good action, particularly against the adults and larval stages.

TABLE III

| Test Compound | All test insects in dorsal position | | | |
|---|---|---|---|---|
| | Mosquitoes | | Cockroaches | |
| | 28 days | 60 days | 28 days | 60 days |
| $CH_3$-pyrazole-$OCON(CH_3)_2$, N-$CH_2CH_2$-$COOC_2H_5$ | 14 | 15 | 35 | 35 |
| $CH_3$-pyrazole-$OCON(CH_3)_2$, N-$CH_2CH_2$-$COO$-n-$C_3H_7$ | 15 | 15 | 35 | 40 |
| $CH_3$-pyrazole-$OCON(CH_3)_2$, N-$CH_2CH_2$-$COOCH_2$-$CH=CH_2$ | 14 | 17 | 35 | 45 |
| $CH_3$-pyrazole-$OCON(CH_3)_2$, N-$CH_2CH_2$-$CON(CH_3)_2$ | 10 | 15 | 95 | 90 |

The results showed that the compounds have a good to very good contact and stomach poisoning action combined with a very pronounced systemic action. They thus have a particularly wide range of insecticidal activity.

It was found that the compounds of Formulas IA and IB have an excelleent action against insects of the families Muscidae and Culicidae, for example, the polyvalent resistant and normal sensitive house flies (*Musca domestica*) and mosquitoes (*Aedes aegypti, Culex fatigans, Anopheles staphensi*), of the families Curculionidae, Bruchidae, Dermistodae, Tenebrionidae, Chrysomelidae, for example, granary weevils (*Sitophilus granaria*), bean weevils (*Bruchidius obtectus*), hide beetles (*Dermestes vulpinus*), yellow mealworms (*Tenebrio molitor*), Colorado potato beetles (*Leptinotarsus decemlineata*) and their larvae in all stages of development, of the family Callophoridae (*Lucilia cuprina*) and their larvae, of the families Pyralididae, e.g. Mediterranean flour moth larvae (*Esphestia kühniella*), Blattidae, e.g. German cockroaches (*Phyllodromia germanica*), Aphididae, e.g. bean aphids (*Aphis fabae*) and Pseudococcidae, e.g. citrus mealy bugs (*Planococcus citri*).

Tests made with leaf aphids (*Aphis fabae*) and desert locusts (*Schistocerca gregaria*) indicate an excellent systemic action in plants. Thus the compounds of the general Formula I can be used as plant protection insecticides just as well as hygiene and veterinary insecticides.

In order to determine the insecticidal activity of compounds according to the invention, the formulas of which are given in the first column of Table III below, these compounds were applied to the surface of aluminum foils In order to determine the acaricidal activity of the test compounds, the formulas of which are shown in the first column of Table IV below, bean (*Vicia taba*) leaves infested with adults and larvae red spiders (*Tetranychus urticae*) are sprayed with an 0.1%-aqueous emulsion or solution of the test compounds. After 3 days the percentage of killed animals of both the adult and the larvae stage is determined. The determined data are given in the second column of Table IV.

TABLE IV

| Test Compound | Percent of Animals killed after 3 days (0.1% Concentration) |
|---|---|
| $CH_3$-pyrazole-$OCON(CH_3)_2$, N-$C_2H_4COOC_2H_5$ | 100 |
| $CH_3$-pyrazole-$OCON(CH_3)_2$, N-$C_2H_4COOCH_2$-$CH=CH_2$ | 100 |
| $CH_3$-pyrazole-$OCON(CH_3)_2$, N-$C_2H_4CON(CH_3)_2$ | 100 |

The maximal activity of the active ingredients according to the invention is attained in the form of coatings, the adhesion of which to the substrate is slight. It was found that good results were attained against the insects and spiders mentioned, when the active ingredients were applied in various forms, e.g. as dusts, wettable powders, emulsion or oil solutions. If the pure active ingredients were applied as smoke, spray, mist and the like, then in the case of mosquitoes the action began within a very short time, whereas with other insects a longer time was taken (up to about 1 hour) until the action began.

The range of action of compounds of general Formula I is widened when they are combined with synergists and auxiliaries having a similar action such as succinic acid dibutyl ester, piperonyl butoxide, DDT active substance, olive oil, peanut oil, phosphoric acid esters and the like.

To promote contact with the pests, the active substances can be applied together with substances acting as attractives or baits such as e.g. mixed with sugar and drawn on to similar materials. Also, the insecticidal action can be substantially widened and made more specific by the addition of other insecticides such as e.g. phosphoric acid esters, carbamic acid esters, halogen hydrocarbons, DDT analogues, pyrethrins and synergists thereof. In addition, the active substances can be mixed and applied with substances having bactericidal, fungicidal or nematocidal properties, whereby a widening of the biological activity is attained.

The fungicidal activity was tested on the following species: *Alternaria tenuis, Botrytis cinerea, Calsterosporium c., Coniothyrium dipl., Fusarium culm.*, Mucor spec., Penicillium spec., *Botrytis fabae, Stemphylium cons*. The results show that the active ingredients according to the present invention have a good to very good fungicidal action.

The heterocyclic carbamic acid esters of the general Formulas IA and IB are obtained according to the invention by reacting a pyrazole derivative of general formula $$\begin{array}{c} R_1-C\!-\!-\!-\!CH_2 \\ \parallel \quad\quad\quad \backslash \\ N \quad\quad\quad C=O \\ \backslash\,N\,\diagup \\ | \\ H \end{array} \quad (II)$$

wherein $R_1$ has the above given meaning, with a compound of general formula $$Y-C\!\diagdown^{O}_{R_9} \quad (III)$$

wherein

Y represents a straight or branched chained optionally halogen-substituted alkenyl radical capable of conversion to the radical —$CHR_4$—$CHR_5$— and $R_9$ represents (a) the group —$OR_8$ wherein $R_8$ has the above given meaning, or (b) the group —$N\diagdown^{R_6}_{R_7}$ wherein $R_6$ and $R_7$ have the meanings given above and reacting the reaction products obtained of the general formula $$\begin{array}{c} R_1-C\!-\!-\!-\!CH_2 \\ \parallel \quad\quad\quad \backslash \\ N \quad\quad\quad C=O \\ \backslash\,N\,\diagup \\ | \\ CHR_4-CHR_5-COR_9 \end{array} \quad (IV)$$

wherein $R_1$, $R_4$, $R_5$ and $R_9$ have the meanings given above, with a compond of the general formula $$Z-C\!\diagdown^{O}_{\displaystyle\mathop{N}\limits_{R_3}^{R_2}} \quad (V)$$

wherein

Z represents a halogen atom such as chlorine or bromine, and $R_2$ and $R_3$ have the meanings given above.

The compounds of the general Formula IV are obtained by a variation of the process described by reacting, instead of a compound of Formula III, an equivalent amount of a compound of the general formula $$Y-CN \quad (VI)$$

wherein

Y has the meaning given above, with a compound of Formula II, and converting the reaction product obtained to a compound of the Formula IV by saponification and esterification in the presence of an inorganic acid. The imido esters formed as intermediate products on esterifying in the presence of an inorganic acid can be isolated in the form of their salts and, if desired, reacted with an amine to form amidines. The compounds of the Formula IVa can be obtained from these amides.

The compounds of the Formula IV can also be produced by condensing hydrazine or derivatives thereof with a cyanide of the Formula VI, then condensing with a β-ketocarboxylic acid ester or diketene and saponifying and esterifying the cyano group. Also, a good yield of the compounds of the Formula IV are obtained from the reaction of hydrazine or derivatives thereof with a compound of the Formula III and subsequent condensation with a β-keto acid ester or diketene.

The compounds of the formula $$\begin{array}{c} R_1-C\!-\!-\!-\!CH_2 \\ \parallel \quad\quad\quad \backslash \\ N \quad\quad\quad C=O \\ \backslash\,N\,\diagup \\ | \\ CH-R_4 \\ | \\ CH-R_5 \\ | \\ C\!=\!O \\ | \\ N \\ \diagup\;\backslash \\ R_6 \quad R_7 \end{array} \quad (IVa)$$

wherein $R_1$, $R_4$, $R_5$, $R_6$ and $R_7$ have the above given meanings, are obtained if a compound of the formula $$\begin{array}{c} R_1-C\!-\!-\!-\!CH_2 \\ \parallel \quad\quad\quad \backslash \\ N \quad\quad\quad C=O \\ \backslash\,N\,\diagup \\ | \\ CH-R_4 \\ | \\ CH-R_5 \\ | \\ CO-OR_8' \end{array} \quad (IVb)$$

wherein $R_1$, $R_4$ and $R_5$ have the meanings given above, $R_8'$ represents hydrogen or an aliphatic, alicyclic or aromatic hydrocarbon radical which may be substituted, is reacted in the known way with an amine of the formula $$HN\diagdown^{R_6}_{R_7} \quad (VII)$$

wherein $R_6$ and $R_7$ have the meanings given above.

According to another variation of the process described, a pyrazole derivative of the Formula II is reacted with a compound of the Formula (Va) and (Vb) to form the corresponding carbamic acid ester and then with a compound of the Formula III.

If desired, the reaction products of the Formula IA and IB are subsequently converted into their salts by reaction with organic or inorganic acids.

The two-step process and its variations described above are performed, if necessary, in the presence of organic solvents such as e.g. aromatic hydrocarbons, ketones, esters and amides. The reaction of the pyrazole derivatives of the Formula II or of the carbamic acid esters produced therefrom with compounds of the Formula III is performed, if necessary, in the presence of a cationic or anionic catalyst such as e.g. glacial acetic acid, potassium carbonate, trimethylamine, triethylamine and pyridine. The temperature at which the reactions in the two-step process and the variations thereof are performed are between 50 and 150° C., particularly between 80 and 120° C.; the duration is 2 to 24 hours.

The reactions with compounds of the Formulas Va and Vb are preferably performed in the presence of an organic or inorganic base and in the presence of a solvent. Examples of organic bases are tertiary amines such as triethylamine and pyridine, examples of inorganic bases are potassium carbonate and hydroxides of alkali and alkaline earth metals. Solvents which can be used are e.g. aromatic hydrocarbons as well as ketones, esters and amides.

In another method of performing the process, phosgene and the corresponding alkylamines are used instead of compounds of general Formulas Va and Vb. To produce compounds of the Formula IA and IB, wherein $R_2$ is hydrogen, according to another variation, the compounds of the Formula II are reacted with an alkyl isocyanate. In this variation of the process, the reactions can also be performed in the presence of the solvents and organic or inorganic bases mentioned above.

In the process and variations thereof described, the esters and amides of the following alkenyl carboxylic acids can be used as compounds of the Formula III: acrylic acid, α-methylacrylic acid, crotonic acid, β-ethylacrylic acid, β-propylacrylic acid, α-methyl-β-ethylarylic acid, α,β-dimethylacrylic acid, β,β-dimethylacrylic acid, trimethylacrylic acid allylacetic acid, hydrosorbic acid, dimethylvinyl acetic acid, α-ethylcrotonic acid, α-chlorocrotonic acid, β-bromocrotonic acid, γ,γ,γ-trichlorocrotonic acid.

Acrylonitrile and the cyanides corresponding to the alkenyl carbocyclic acids given above can be used for example as alkenyl cyanides of the Formula VI.

Compounds of the following types, for example, are produced by the method described above and the variations thereof:

1-[α-alkyl-β-(alkoxycarbonyl)-ethyl]-3 - alkyl - pyrazolyl-(5)-carbamic acid ester, 1-[β-alkyl-β-(alkoxycarbonyl)-ethyl] - 3-alkyl-pyrazolyl-(5)-carbamic acid ester, 1-[α-halogen-β-(alkoxycarbonyl)-ethyl] - 3 - alkyl-pyrazolyl-(5)-carbamic acid water, 1[α-alkyl-β-(alkylcarbamyl)-ethyl] - 3 - alkyl-pyrazolyl-(5)-carbamic acid ester, 1-[β-alkyl-β-(dialkylcarbamyl) - ethyl]-3-alkyl-pyrazolyl-(5)-carbamic acid ester, 1-[β-(alkoxycarbamyl)-ethyl] - 3 - alkyl - pyrazolyl-(5)-carbamic acid ester.

The following limitative examples serve to illustrate the invention further. Where not otherwise stated, parts and percentages are given by weight unless stated expressly otherwise and the temperatures are in degrees centigrade.

Example 1

49 parts of 3-methyl-pyrazolone-(5) are dissolved in 300 parts by volume of dimethyl formamide. 1 part by volume of glacial acetic acid is then added and the whole is added dropwise to a solution of 43 parts of acrylic acid methyl ester. The reaction mixture is heated to 80° within 5 hours and then heated for 15 hours at 90–95° while stirring. It is then concentrated in vacuo. The residue is recrystallized from chlorobenzene and petroleum ether. 1-[β-(methoxycarbonyl)-ethyl] - 3 - methyl - pyrazolone-(5) is obtained which melts at 102–106°.

48 parts of 1-[β-(methoxycarbonyl) - ethyl]-3-methyl-pyrazolone-(5), 44 parts of calcined potash, 0.5 part of potassium iodide and 31 parts of dimethyl-carbamic acid chloride in 400 parts by volume of benzene are refluxed for 15 hours while stirring. The precipitate is filtered off and the filtrate is concentrated in vacuo. The residue can be distilled. 1-[β-(methoxycarbonyl) - ethyl]-3-pyrazolyl-(5)-N-dimethyl-carbamic acid ester is obtained. $B.P._{0.01}$: 152–156°.

Example 2

16.9 parts of 3-methyl-pyrazolyl-(5)-N-dimethyl - carbamic acid ester, 10 parts of acrylic acid ethyl ester and 3 parts by volume of glacial acetic acid are heated at 100–105° in an oil bath for 15 hours. The reaction mixture is then diluted with 150 parts by volume of ether, the ethereal solution is washed with 10%-sodium carbonate solution and then with water and the ethereal solution is dried with sodium sulphate. After removal of the ether, the residue is distilled. 1 - [β - ethoxycarbonyl - ethyl] - 3-methyl-pyrazolyl - 5 - dimethyl carbamic acid ester is obtained. It boils at 170–171.5° under 0.03 mm. pressure.

On using equivalent amounts of the correspondingly substituted acrylic acid esters, pyrazolone derivatives and carbamyl chlorides, the following compounds falling under Formula IB are obtained by the method described in the above examples, in which the substituents $R_1$, $R_2$, $R_3$, $R_4$, $R_5$ and $R_8$ are those given in the corresponding columns of Table I below.

TABLE I

| Example No. | $R_1$ | $R_2$ | $R_3$ | $R_4$ | $R_5$ | $R_8$ |
|---|---|---|---|---|---|---|
| 3 | $CH_3$ | $CH_3$ | $CH_3$ | H | H | $Cl-CH_2-CH_2-$ |
| 4 | $CH_3$ | $CH_3$ | $CH_3$ | H | H | $n-C_3H_7-$ |
| 5 | $CH_3$ | $CH_3$ | $CH_3$ | H | H | $iso-C_3H_7-$ |
| 6 | $CH_3$ | $CH_3$ | $CH_3$ | H | H | $CH_2=CH-CH_2-$ |
| 7 | $CH_3$ | $CH_3$ | $CH_3$ | H | H | $n-C_4H_9-$ |
| 8 | $CH_3$ | $CH_3$ | $CH_3$ | H | H | $\begin{array}{c}CH_3\\ \diagdown\\ CH-CH_2-\\ \diagup\\ CH_3\end{array}$ |

TABLE I—Continued

| Example No. | $R_1$ | $R_2$ | $R_3$ | $R_4$ | $R_5$ | $R_8$ |
|---|---|---|---|---|---|---|
| 9 | $CH_3$ | $CH_3$ | $CH_3$ | H | H | $CH_3-CH_2-CH(CH_3)-$ |
| 10 | $CH_3$ | $CH_3$ | $CH_3$ | H | H | $n-C_5H_{11}-$ |
| 11 | $CH_3$ | $CH_3$ | $CH_3$ | H | H | $(CH_3)_2CH-CH_2-CH_2-$ |
| 12 | $CH_3$ | $CH_3$ | $CH_3$ | H | H | $n-C_6H_{13}-$ |
| 13 | $CH_3$ | $CH_3$ | $CH_3$ | H | H | Cyclohexyl- |
| 14 | $CH_3$ | $CH_3$ | $CH_3$ | H | H | Cyclopentyl- |
| 15 | $CH_3$ | $CH_3$ | $CH_3$ | H | H | $CH_3O-CH_2-CH_2-$ |
| 16 | $CH_3$ | $CH_3$ | $CH_3$ | H | $CH_3$ | $C_2H_5-$ |
| 17 | $CH_3$ | $CH_3$ | $CH_3$ | H | H | $C_2H_5-$ |
| 18 | $CH_3$ | $CH_3$ | $CH_3$ | H | $CH_3$ | $CH_3-$ |
| 19 | $CH_3$ | $CH_3$ | $CH_3$ | H | H | $CH_3S-CH_2-CH_2-$ |
| 20 | $CH_3$ | $C_2H_5$ | $C_2H_5$ | H | H | $C_2H_5-$ |
| 21 | $CH_3$ | $CH_2=CH-CH_2-$ | $CH_2=CH-CH_2-$ | H | H | $C_2H_5-$ |
| 22 | $CH_3$ | $CH_3$ | $CH_3$ | H | H | $CH\equiv C-CH_2-$ |
| 23 | $CH_3$ | $CH_3$ | $CH_3$ | H | H | $CH_3-C\equiv C-CH_2-$ |
| 24 | $CH_3$ | $C_2H_5$ | $C_2H_5$ | H | H | 2'-methylcyclopentyl- |
| 25 | $CH_3$ | $C_2H_5$ | $C_2H_5$ | H | H | 3'-methylcyclohexyl |
| 26 | H | $CH_3$ | $CH_3$ | H | H | $\Delta^2$-cyclopentenyl |
| 27 | $CH_3$ | $CH_2=CH-CH_2-$ | $CH_2=CH-CH_2-$ | H | H | $\Delta^2$-cyclohexenyl |
| 28 | $CH_3$ | $CH_3$ | $CH_3$ | H | H | 4'-methyl-$\Delta^2$-cyclopentenyl- |
| 29 | $CH_3$ | $CH_3$ | $CH_3$ | H | H | 4'-methyl-$\Delta^2$-cyclohexenyl- |
| 30 | $C_2H_5$ | $CH_3-CH=CH-CH_2-$ | $CH_3-CH=CH-CH_2-$ | H | H | Phenyl |
| 31 | $CH_3$ | H | $CH_3$ | Cl | Cl | 3'-methyl-phenyl- |
| 32 | $CH_3$ | $CH_3$ | $CH_3$ | H | H | 3',4'-dichlorophenyl- |
| 33 | $CH_3$ | H | $C_2H_5$ | H | Br | 4'-bromo-phenyl- |
| 34 | $CH_3$ | $n-C_3H_7-$ | $n-C_3H_7-$ | H | H | 2'-methoxy-phenyl |
| 35 | $CH_3$ | $CH_3$ | $CH_3$ | H | H | 4'-nitro-phenyl- |
| 36 | $n-C_3H_7-$ | $C_2H_5$ | $C_2H_5$ | H | Cl | $Br-CH_2-CH_2-$ |
| 37 | $CH_3$ | $CH_3$ | $CH_3$ | Cl | H | $HO-CH_2-CH_2-$ |
| 38 | $n-C_4H_9-$ | $n-C_4H_9-$ | $n-C_4H_9-$ | $C_2H_5$ | H | Benzyl- |
| 39 | $CH_3$ | $CH_3$ | $CH_3$ | H | H | 4'-chloro-benzyl |
| 40 | $CH_3$ | H | $CH_3$ | Br | H | 4'-bromo-benzyl |
| 41 | H | $CH_3$ | $CH_3$ | H | H | Phenyl-$CH_2-CH_2-$ |
| 42 | $CH_3$ | $CH_3$ | $CH_3$ | H | H | Cinnamyl |
| 43 | $C_2H_5$ | iso-$C_3H_7-$ | iso-$C_3H_7-$ | H | H | $C_2H_5-$ |
| 44 | $CH_3$ | $CH_3$ | $CH_3$ | F | F | $CH_3-$ |

Example 45

(a) 37 parts of 1-(β-methoxycarbonylethyl)-3-methylpyrazolone-(5), 110 parts of a 41% aqueous dimethylamine solution and 110 parts by volume of ethanol are rotated in a steel autoclave for 8 hours at 80-100°. To work up, animal charcoal is added to the dark solution which is then filtered. The filtrate is concentrated in vacuo. The residue is extracted 4 times with 100 parts of hot benzene to remove non-reacted carboxyl esters. The undissolved residue is not further worked up.

(b) 38 parts of the residue, 53.1 parts of calcined potassium carbonate, 2 parts of potassium iodide, 50.2 parts of dimethyl carbamic acid chloride in 150 parts by volume of benzene are refluxed for 12 hours while stirring. The precipitate formed is filtered off and the benzene is distilled off in vacuo. The residue, 1-[β-(N,N-dimethylcarbamyl) - ethyl] - 3 - methyl - pyrazolyl - (5) - N,N-dimethyl carbamic acid ester is purified by distillation. B.P.$_{0.01}$: 152–153.5°.

Using an equivalent amount of 35% aqueous methylamine solution in the method described above, 1-[β-(methylcarbamyl) - ethyl] - 3 - methyl - pyrazolyl - (5)-N,N-dimethyl carbamic acid ester is obtained. It melts at 85–88°.

Example 46

49 parts of 3-methylpyrazolone-(5) are suspended in 300 parts by volume of dimethyl formamide. 2 parts by volume of glacial acetic acid are then added and 27 parts of acrylonitrile are added dropwise at room temperature. The reaction mixture is then stirred for 12 hours at 80° whereupon a clear solution is formed. This solution is worked up by evaporating off the solvent and recrystallizing the residue from benzene. 1-[β-cyanoethyl]-3-methyl-pyrazolone-(5) is obtained. M.P. 111–112.5°.

62 parts of 1-[β-cyanoethyl]-3-methyl-pyrazolone-(5) are refluxed for 5 hours with 300 parts by volume of concentrated hydrochloric acid. The reaction mixture is worked up by neutralizing to a pH of 7 while cooling with ice and then evaporating to dryness in a rotary evaporator. The residue is purified by recrystallization from water. The acid melts at 178–180°.

17 parts of the above acid are esterified by dissolving in 250 parts by volume of methanol and adding 1 part by volume of concentrated sulphuric acid. The solution is refluxed for 12 hours, whereupon it is worked up by evaporating to dryness and recrystallizing the residue from water. 1 - [β - (N - methoxy - carbonyl) - ethyl] - 3-methyl-pyrazolone-(5) is obtained (M.P. 105–112°). This can be processed further as described in Example 45(b).

Example 47

49 parts of 3-methyl-pyrazolone-(5) are dissolved in 300 parts by volume of dimethyl formamide. 1 part by volume of glacial acetic acid is then added and the whole is added dropwise to a solution of 77 parts by weight of acrylic N,N-di-n-propyl amide. The reaction mixture is heated to 80°–90° within 5 hours and then heated for 1 hour at 90°–95° while stirring. It is then concentrated in vacuo. The residue is directly used in the next following reaction.

62 parts by weight of the above obtained 1-[β-(N,N-di-n-propyl-carbamyl)-ethyl] - 3 - methyl-pyrazolone-(5), 46 parts of calcined potash, 0.5 part of potassium iodide and 20.4 parts of dimethylcarbamic acid chloride in 350 parts by volume of benzene are refluxed for 6 hours while stirring. The precipitate is filtered off and the filtrate is concentrated in vacuo. The residue can be distilled. 1-[β-N, N - di - n - propyl - carbamyl) - ethyl] - 3 - methyl - pyrazolyl - (5) - N - dimethyl - carbamic acid ester is obtained. B.P.$_{0.4}$: 170–175°.

When using equivalent amounts of corresponding substituted acrylic acid amides, pyrazolone derivatives and carbamyl chlorides, the following compounds falling under Formula IA are obtained, in which the substituents $R_1$, $R_2$, $R_3$, $R_4$, $R_5$, $R_6$ and $R_7$ are those given in the corresponding column of Table II below:

TABLE II

| Example No. | $R_1$ | $R_2$ | $R_3$ | $R_4$ | $R_5$ | $R_6$ | $R_7$ |
|---|---|---|---|---|---|---|---|
| 48 | $CH_3$ | $CH_3$ | $CH_3$ | H | H | H | n-$C_3H_7$— |
| 49 | $CH_3$ | $CH_3$ | $CH_3$ | H | H | $C_2H_5$— | $C_2H_5$— |
| 50 | $CH_3$ | $CH_3$ | $CH_3$ | H | H | iso-$C_3H_7$— | iso-$C_3H_7$— |
| 51 | $CH_3$ | $CH_3$ | $CH_3$ | H | H | H | n-$C_4H_9$— |
| 52 | $CH_3$ | $CH_3$ | $CH_3$ | H | H | Phenyl | H |
| 53 | H | $C_2H_5$ | $C_2H_5$ | H | $CH_3$ | n-$C_4H_9$— | n-$C_4H_9$— |
| 54 | $C_2H_5$ | $CH_3$ | $CH_3$ | $CH_3$ | H | Cyclohexyl | H |
| 55 | $CH_3$ | $C_2H_5$ | $C_2H_5$ | H | H | 3'-methylphenyl | $CH_3$ |
| 56 | n-$C_3H_7$— | $CH_3$ | $CH_3$ | $C_2H_5$ | H | 4'-bromophenyl | H |
| 57 | $CH_3$ | n-Propyl | n-Propyl | H | H | —$CH_2OH$ | H |
| 58 | $CH_3$ | $CH_2=CH-CH_2$ | $CH_2=CH-CH_2$— | $CH_3$ | H | HO-$CH_2$-CH— | HO—$CH_2$—$CH_2$— |
| 59 | $C_2H_5$ | $CH_3$ | $CH_3$ | H | H | $CH_3O$—$CH_2$—$CH_2$—$CH_2$— | H |
| 60 | $CH_3$ | $C_2H_5$ | $C_2H_5$ | H | Cl | Cl—$CH_2$—$CH_2$— | Cl—$CH_2$—$CH_2$— |
| 61 | $CH_3$ | $CH_3$ | $CH_3$ | Br | Br | H | Br—$CH_2CH_2$— |
| 62 | n-$C_3H_7$ | $CH_3$ | $CH_3$ | Cl | H | CN—$CH_2CH_2$— | CN—$CH_2CH_2$— |
| 63 | $CH_3$ | $CH_3$ | $CH_3$ | H | H | Piperidino- | |
| 64 | $CH_3$ | $CH_3$ | $CH_3$ | H | H | Morpholino- | |
| 65 | $C_2H_5$ | $CH_3$ | $CH_3$ | F | F | $CH_3$ | $CH_3$ |
| 66 | $CH_3$ | $C_2H_5$ | $C_2H_5$ | Cl | H | 4'-ethyl-piperidino— | |
| 67 | $CH_3$ | $CH_3$ | $CH_3$ | Cl | Cl | 2',6'-dimethyl-morpholino— | |

As has already been mentioned, the compounds according to the present invention have an extraordinarily wide range of action and can be used for the combatting of pests in the most various fields. Because of the many types of pests which can be combatted, the various forms of application must, therefore, be adapted to the special purposes desired. It is recommended and also more economical, to combine the active ingredients with suitable additives, including water; solutions, dispersions, pastes, dusts and sprinkling agents and wettable powders are particularly suitable forms for application. The dispersions, pastes and wettable powders (for spraying) are concentrates which can be diluted with water, so forming suspensions and emulsions, to any concentration desired.

Organic solvents such as aliphatic and alicyclic alcohols, ketones, hydrocarbons such as benzene, xylenes, toluene, benzines, also chlorinated and fluorinated hydrocarbons as well as water are used in particular for the production of solutions. In some cases it is necessary to produce a so-called carrier solution from the active ingredient and the solvents mentioned above and then to dissolve this in higher boiling solvents, e.g., in petroleum fractions such as kerosene, methyl naphthalenes, xylenes, benzines etc. Solutions of active substances in aromatic hydrocarbons such as, e.g., xylenes, toluene and halogenated hydrocarbons such as chlorobenzene and such like are particularly suitable for direct spraying of objects and for the impregnation of materials such as, e.g., textiles.

In addition to the form of organic solutions, the active substances according to the invention can also be applied to aqueous forms such as dispersions (emulsions and suspensions). To produce an emulsion, the substances, in one of the solvents mentioned above, are homogenized in water, preferably in the presence of a dispersing agent.

Cationic, anionic and non-ionogenic preparations are employed as dispersing or emulsifying agents. Examples of cationic preparations which can be used are quaternary ammonium compounds and morpholine derivatives. Anionic dispersing or emulsifying agents are soaps, alkali and alkaline earth salts of long chained aliphatic sulphuric acid monoesters, of aliphatic-aromatic sulphonic acids or of long chained, alkoxyacetic acids. Examples of non-ionogenic dispersing or emulsifying agents which can be used to work up the active substances according to the invention into pest control agents are polyethylene glycol ethers of fatty alcohols or alkylphenols, polycondensation products of ethylene and propylene oxides, water soluble cellulose derivatives, alkyl alkanolamides and sugar derivatives of higher fatty acids. Also, film-forming and adhesive agents can be added to the emulsions or dispersions such as, e.g., mineral and vegetable oils, polyvinyl alcohols, polyvinyl pyrrolidones or hydroxyalkyl cellulose. Also, paste-like or liquid concentrates can be produced from the active substances according to the invention and the emulsifying and dispersing agents mentioned above, possibly with the addition of solvents, thickeners, protective colloids and other ointment bases, which concentrates can be diluted with water to any concentration desired.

For dusts and sprinking agents, the active ingredients are brought onto finely milled or granulated carriers by various means. The carriers can be inert, acid or alkaline. Thus, the carriers can be impregnated with the solutions of the active substances as described above, also the solid active substances can be milled with the carriers or the carriers can be impregnated with the melted active substances. Carriers of these forms for application are inorganic silicates, e.g. kaolins, montmorillonites, bentonites, zeolites, kieselguhr, diatomaceous earth, powdered glass, loess, also talcum, magnesia usta, boric acid, tricalcium phosphate, in some cases calcium carbonate, for example in the form of whiting, burnt lime and finely ground limestone. In addition organic substances such as sawdust, powdered cork, walnut shell flour or walnut shell granulate etc. can serve as carriers. Also, it is advisable to use mixtures of the inorganic and/or organic carriers mentioned above.

Pulverulent preparations can be made suspendible in water by the addition of capillary active substances such as wetting agents, e.g. sulphite waste liquor, and dispersing agents e.g. those mentioned above, and in the suspended form can be used as wettable powders. In some cases the addition of adhesives such as e.g. polyvinyl alcohols, polyvinyl pyrrolidone, alkaline earth salts and alkali metal salts of long chained, aliphatic fatty acids, mineral or vegetable oils as well as certain protective colloids and/or thickeners such as glue, alginates and casein is recommended.

The following examples describe the production of various forms for application. The parts are given as parts by weight.

Example I
Spray:

(a) 2 parts of the active substance produced according to Example 2 are dissolved in 10 parts of xylene and 88 parts of petroleum.

(b) 2 parts of active substance and 3 parts of 1,1-bis-(p - chlorophenyl) - 2,2,2 - trichloroethane are dissolved in 10 parts of xylene or another auxiliary solvent and 85 parts of petroleum.

Both solutions are excellently suitable, for example for combatting flies and mosquitoes in houses as well as in store rooms and slaughter houses.

Example II
Smoke:

(a) 20 parts of the active substance produced according to Example 8, are mixed with 61 parts of sawdust which has been previously impregnated with 18.4 parts of potassium nitrite, and the mass is made, under pressure, into tablets.

(b) 50 parts of active substance, 22 parts of sugar, 12 parts of potassium chlorate, 2.4 parts of potassium nitrate and 13.6 parts of sawdust are milled and thoroughly mixed. The mass is put into boxes and lit with a wick or fuse.

Example III
Smoke papers:

Ordinary filter paper is treated with a 5% potassium nitrate solution. The active substance produced according to Example 17 is drawn onto this filter paper in the form of a 25%-acetone solution. The smoke paper so obtained contains about 30% of active substance.

The insecticidal smoke formed from the tablets and the mass for smoking is especially suitable for combatting insects in enclosed spaces.

Example IV
Vapour:

The active substance produced as described in Example 6 is evaporated by heating on an electric hot plate. In this way, the insects in an enclosed space are killed.

Example V
Dust:

1 part of the active substance produced according to Example 1 is milled as finely as possible with 99 parts of talcum. The adhesive power of this powder can be increased by the addition of 2 parts of a liquid fatty acid. This dust can be used, for example, for combatting pests particularly in the household and in larders and store-rooms.

Example VI
Sprinkling agent:

1 part of the active substance produced according to Example 45 is mixed with 99 parts of a silicate. This sprinkling agent is suitable for all uses where a finely pulverized material is unsuitable because of dust formation.

Example VII
Emulsion:

25 parts of the active substance produced according to Example 51 are dissolved in a mixture of 50 parts of cyclohexanone and 15 parts of dimethyl formamide and 10 parts of a mixture of an alkylaryl ethylene condensation product and of an alkylaryl sulphonic acid salt are added. This concentrate can be diluted with water to any concentration desired to form an emulsion.

Example VIII
Wettable powder:

(a) 25 parts of the active substance produced according to Example 1, 15 parts of diatomaceous earth, 52.5 parts of kaolin, 5 parts of a wetting agent such as e.g. a sulphuric acid ester of an alkyl polyglycol ether and 2.5 parts of a dispersing agent, e.g. a polyvinyl pyrrolidone or a neutralized condensation product of naphthalene sulphonic acids and formaldehyde, are thoroughly mixed and milled. An about 25% wettable powder is obtained, with which stable suspensions can be produced with water in the presence of an additive which regulates the pH value. The total suspension power of this form of application is 87%; it can be well wetted and pasted.

(b) 25 parts of active substance are mixed and milled with 10 parts of a silicate, 5 parts of a dispersing agent, for example, an alkylpolyglycol ether, 2 parts of a wetting agent, e.g. an ethylene oxide condensation product, and about 50 parts of kaolin.

I claim:

1. A method of combatting insects and their larvae

15 comprising contacting the insects with an insecticidally effective amount of a compound of the formula

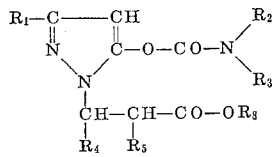

wherein

R₁ is a member selected from the group consisting of hydrogen and lower alkyl,

R₂ is a member selected from the group consisting of lower alkyl and alkenyl of from 3 to 4 carbon atoms, R₃ is a member selected from the group consisting of lower alkyl and alkenyl of from 3 to 4 carbon atoms, each of R₄ and R₅ is a member selected from the group consisting of hydrogen, lower alkyl, chlorine, bromine and fluorine, R₈ is a member selected from the group consisting of alkyl of from 1 to 6 carbon atoms, alkenyl of from 2 to 6 carbon atoms, propargyl, methyl-propargyl, cyclopentyl, lower lower-alkyl-cyclopentyl, cyclohexyl, lower alkyl-cyclohexyl, cyclopentenyl, cyclohexenyl, lower alkyl-cyclopentenyl, lower alkyl-cyclohexeny, phenyl, lower alkyl-phenyl, chlorophenyl, bromophenyl, lower alkoxyphenyl, nitrophenyl, cinnamyl, chloro-alkyl, bromo-alkyl, hydroxy-alkyl, lower alkoxy-alkyl and lower alkylthio-alkyl, alkyl in the last five members being from 2 to 4 carbon atoms, phenyl-alkyl, chlorophenyl-alkyl, bromo-phenyl-alkyl and lower alkyl-phenyl-alkyl, alkyl in the last four members being from 1 to 2 carbon atoms.

2. A method of combatting insects and their larvae, according to claim 1, wherein the said compound is 1-[β-(ethyloxycarbonyl) - ethyl] - 3 - methyl -pyrazolyl - (5)- N,N-dimethyl carbamic acid ester, 1-[β-(n-propyloxycarbonyl) - ethyl] - 3 - methyl - pyrazolyl - (5) - N,N - dimethylcarbamic acid ester, 1-[β-(methyloxycarbonyl)-ethyl] - 3 - methyl - pyrazolyl - (5) - N,N - dimethyl carbamic acid ester, 1-[β-(allyloxycarbonyl)-ethyl]-3-methyl - pyrazolyl - (5) - N,N - dimethyl carbamic acid ester or 1 - [α - methyl - β(ethyloxycarbonyl) - ethyl] - 3-methyl-pyrazolyl-(5)-N,N-dimethyl carbamic acid ester.

3. A method of combatting insects and their larvae comprising contacting the insects with an insecticidally effective amount of a compound of the formula

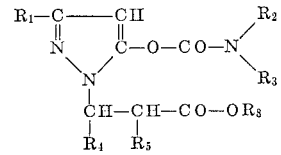

wherein

R₁ is a member selected from the group consisting of hydrogen and lower alkyl,

R₂ is a member selected from the group consisting of lower alkyl and alkenyl of from 3 to 4 carbon atoms, R₃ is a member selected from the group ocnsisting of lower alkyl and alkenyl of from 3 to 4 carbon atoms, R₄ and R₅ is a member selected from the group consisting of hydrogen, lower alkyl, chlorine, bromine and fluorine, R₆ is a member selected from the group consisting of hydrogen, lower alkyl, cyclohexyl, lower alkyl-cyclohexyl, phenyl, lower alkyl-phenyl, chloro-phenyl, bromophenyl, hydroxy-lower alkyl, lower alkoxy-lower alkyl, chloro-lower alkyl, bromo-lower alkyl and cyano-lower alkyl, R₇ is a member selected from the group consisting of hydrogen, lower alkyl, hydroxy-lower alkyl, lower

16 alkoxy-lower alkyl, chloro-lower alkyl, bromo-lower alkyl and cyano-lower alkyl, R₆ and R₇ taken together with the nitrogen atoms to which they are linked are a member selected from the group consisting of piperidino, morpholino, lower alkyl-piperidino and lower alkyl-morpholino.

4. A method of combatting insects and their larvae, according to claim 3, wherein the said compound is 1-[β-(N,N - dimethylcarbamyl) - ethyl] - 3 - methyl-pyrazolyl-(5)-N,N-dimethyl carbamic acid ester of 1-[β-(methylcarbamyl) - ethyl] - 3 - methyl - pyrazolyl - (5) - N - dimethylcarbamic acid ester.

5. A composition for killing mealy bugs and larvae of the blow fly, consisting essentially of a pesticidally effective amount of (a) a compound of the formula

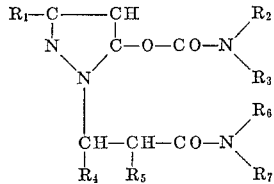

wherein

R₁ is a member selected from the group consisting of hydrogen and lower alkyl,

R₂ is a member selected from the group consisting of lower alkyl and alkenyl of from 3 to 4 carbon atoms, R₃ is a member selected from the group consisting of lower alkyl and alkenyl of from 3 to 4 carbon atoms, each of R₄ and R₅ is a member selected from the group consisting of hydrogen, lower alkyl, chlorine, bromine and fluorine.

R₈ is a member selected from the group consisting of alkyl of from 1 to 6 carbon atoms, alkenyl of from 2 to 6 carbon atoms, propargyl, methyl-propargyl, cyclopentyl, lower-alkyl-cyclopentyl, cyclohexyl, lower alkyl-cyclohexyl, cyclopentenyl, cyclohexenyl, lower alkyl-cyclopentenyl, lower alkyl-cyclohexenyl, phenyl, lower alkyl-phenyl, chlorophenyl, bromophenyl, lower alkoxyphenyl, nitrophenyl, cinnamyl, chloro-alkyl, bromo-alkyl, hydroxy-alkyl, lower alkoxy-alkyl and lower alkyl-thio-alkyl, alkyl in the last five members being from 2 to 4 carbon atoms, phenyl-alkyl, chlorophenyl-alkyl, bromo-phenyl-alkyl and lower alkyl-phenyl-alkyl, alkyl in the last four members being from 1 to 2 carbon atoms, and (b) an inert carrier therefor.

6. A composition for killing mealy bugs and larvae of the blow fly, according to claim 5, wherein the said compound is 1 - [β - (ethyloxycarbonyl) - ethyl] - 3-methyl-pyrazolyl-(5)-N,N-dimethyl carbamic acid ester, 1 - [β - (n - propyloxycarbonyl) - ethyl] - 3 - methyl-pyrazolyl-(5)-N,N-dimethyl carbamic acid ester, 1-[β-(methyloxycarbonyl) - ethyl] - 3 - methyl - pyrazolyl-(5)-N,N-dimethyl carbamic acid ester, 1-[β-(allyloxycarbonyl) - ethyl] - 3 - methyl - pyrazolyl - (5) - N,N, - dimethyl carbamic acid ester or 1-[α-methyl-β-(ethyloxycarbonyl) - ethyl] - 3 - methyl - pyrazolyl - (5) - N,N-dimethyl carbamic acid ester.

7. A composition for killing mealy bugs and larvae of the blow fly, consisting essentially of a pesticidally effective amount of (a) a compound of the formula

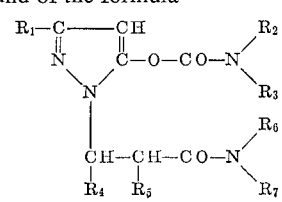

wherein $R_1$ is a member selected from the group consisting of hydrogen and lower alkyl, $R_2$ is a member selected from the group consisting of lower alkyl and alkenyl of from 3 to 4 carbon atoms, $R_3$ is a member selected from the group consisting of lower alkyl and alkenyl of from 3 to 4 carbon atoms, each of $R_4$ and $R_5$ is a member selected from the group consisting of hydrogen, lower alkyl, chlorine, bromine and fluorine, $R_6$ is hydrogen, lower alkyl, cyclohexyl, lower alkyl-cyclohexyl, phenyl, lower alkyl-phenyl, chlorophenyl, bromophenyl, hydroxy-lower alkyl, lower alkoxy-lower alkyl, chloro-lower alkyl, bromo-lower alkyl and cyano-lower alkyl.

$R_7$ represents hydrogen, lower alkyl, hydroxy-lower alkyl, lower alkoxy-lower alkyl, chloro-lower alkyl, bromo-lower alkyl and cyano-lower alkyl, $R_6$ and $R_7$ taken together with the nitrogen atoms to which they are linked are a member selected from the group consisting of piperidino, morpholino, lower alkyl-piperidino and lower alkyl-morpholino.

and (b) an inert carrier therefor.

8. A composition for killing mealy bugs and larvae of the blow fly, according to claim 7, wherein the said compound is 1 - [β - (N,N - dimethylcarbamyl) - ethyl] - 3-methyl-pyrazolyl-(5)-N,N-dimethyl carbamic acid ester or 1 - [β - (methyl-carbamyl) - ethyl] - 3 - methyl - pyrazolyl-(5)-N-dimethyl carbamic acid ester.

References Cited

UNITED STATES PATENTS

| 2,476,986 | 7/1949 | Martin | 260—310 |
| 2,476,988 | 7/1949 | Martin | 260—310 |
| 2,681,915 | 6/1954 | Gysin et al. | 260—310 |
| 2,853,416 | 9/1958 | Kellog | 167—33 |
| 2,976,295 | 3/1961 | Plue | 260—310 |
| 2,998,425 | 8/1961 | Dickinson | 260—310 |
| 3,012,935 | 12/1961 | Goodhue | 167—33 |

OTHER REFERENCES

Avdeeva et. al., Chem. Abst., 57, p. 3828 (1962).

Casada et. al., J. Econ. Entomol., 53 (1960), pp. 205–208.

E.V. Avdeeva et al., Insektizidnye svoista neko tory kh pira zolilk arbamatov, published in Vestnik Moskovskovo Universiteta, No. 6 (1961), p. 19 et seq.

ALBERT T. MEYERS, *Primary Examiner.*

S. FRIEDMAN, *Assistant Examiner.*

U.S. Cl. X.R.

424—248, 267, 300, 354, 187, 128